United States Patent Office 3,484,521
Patented Dec. 16, 1969

3,484,521
ENHANCEMENT OF MEMORY PROCESSES IN MAMMALS WITH BASIC ADDITION SALTS OF RIBONUCLEIC ACID
Alvin J. Glasky, Santa Ana, Calif., assignor to International Chemical and Nuclear Corporation, City of Industry, Calif., a corporation of California
No Drawing. Filed June 23, 1966, Ser. No. 559,712
Int. Cl. A61k 25/00
U.S. Cl. 424—200     3 Claims

ABSTRACT OF THE DISCLOSURE

A process for the enhancement of memory processes in mammals by the administration of an effective amount of a basic addition salt of ribonucleic acid.

This invention relates to a novel and improved process for producing central nervous system stimulation in mammals, including animals and humans.

Previously, it has been observed that ribonucleic acid administered intravenously has some beneficial effect upon the memory performance of patients suffering from organic memory defects. The present invention is concerned with the use of certain novel substituted ammonium basic addition salts of ribonucleic acid for the producing of central nervous system stimulation in mammals. The available scientific evidence strongly indicates that these novel salts are uniquely effective in stimulating the synthesis of ribonucleic acid in the central nervous system, an effect which is believed to be basic to the therapeutic effectiveness of memory improving drugs.

Accordingly, it is the principal object of the present invention to provide a novel process for producing central nervous system stimulation in mammals.

It is the further object of the present invention to provide a novel process for producing central nervous system stimulation in human beings.

Still another object of the present invention is the process for producing central nervous system stimulation in animals.

More particularly it is the object of the present invention to produce central nervous system stimulation in mammals by the administration of effective amounts of certain novel substituted ammonium basic addition salts of ribonucleic acid.

These and other objects are the advantages of the present invention and will become apparent from the more detailed description which follows:

Briefly, the present invention comprises a process for producing central nervous system stimulation in mammals by the administration of an effective amount of substituted ammonium basic addition salts of ribonucleic acid. These salts typically are the reaction product of ribonucleic acid and a substituted organic amine. Typical of such substituted ammonium basic addition salts are 2-diethylammonium ethanol ribonucleate, 2-dimethylammonium ethanol ribonucleate, the salt of disodium aspartic acid and ribonucleic acid, and the salt of disodium glutamic acid and ribonucleic acid. These novel salts and their method or preparation are more fully described in application's co-pending U.S. patent application Ser. No. 560,924, filed concurrently herewith, now Patent No. 3,438,968, the disclosure of which is expressly incorporated herein by reference.

While not bound by any theory it is believed that the therapeutic effectiveness of the novel salts of the present invention is due to the fact that they have the capability of stimulating the synthesis of ribonucleic acid in the central nervous system.

It appears that ribonucleic acid is a carrier of genetic information, and in particular it is postulated that ribonucleic acid is the macromolecule involved in the learing process. This view is reinforced by the fact that it has been shown that as cells age, there is concomitant loss of ribonucleic acid in cells in all parts of the body. In any event, it has been observed that the novel substituted ammonium addition salts of ribonucleic acid are effective in producing stimulation of ribonucleic acid synthesis in the brain. Therefore, these compounds are particularly useful for improving the memory performance of patients suffering from organic memory defects and the like. In addition, these compounds are a benefit in increasing the mental concentrations of human beings, increasing the learning speed, improving the mental capacities of individuals who are functioning at below normal level because of retarded development of the central nervous system, improving behavioral disorders, particularly in children, and producing a general feeling of well being in, for example, the senile or depressed subjects.

The novel substituted ammonium basic addition salts of this invention may be administered, normally in solution form by intravenous injection. The administration of aqueous solutions containing from 300 milligrams to 5.0 grams per day per patient of the salts is the most convenient means of administration. However, the salts may be administered orally and by other procedures which will be apparent to those skilled in the art. The salts are typically administered in 0.25 gram amounts over periods ranging from 3 to 6 hours at the rate of 14 to 28 times per week. Both the speed of administration and frequency depend upon the degree of side reactions.

The efficacy of the novel ammonium basic addition salts in improving the memory performance of animals was demonstrated in the following tests:

The following examples are presented solely for the purpose of illustration and should not be regarded as limiting in any way.

EXAMPLE I

Effect of diethylamino ethanol ribonucleate on learning and memory of rats

Testing was performed using the jump-out apparatus of Cook et al. (Science 141: 268, 1963) as applied by Plotnikoff (Science 151: 703, 1966). Animals were pretested on day 1 for three trials and paired according to jump-out time. On day 2, one animal of each pair received an injection of diethyl amino ethanol ribonucleate solution in physiological saline, 100 mg./kg. intraperitoneally while the other paired animal received an injection of physiological saline. One hour after receiving one injection, the control and drug treated animals in each pair were tested alternately for acquisition of the jump-out response using a test sequence of 15 seconds of silence, 10 seconds of buzzer, 5 seconds of buzzer plus shock and then 10 seconds of silence. The jump out time was recorded as the elapsed time, in seconds, in the 40-second sequence at which the animal jumped to the escape platform.

In 9 out of 12 pairs of slow learners (jump-out time of 30.4 seconds on day 1), the animals treated with diethyl amino ethanol ribonucleate showed greater improvement (faster jump-out response) than the paired control animals on the first trial.

In 4 out of 7 pairs of fast learners (jump-out time of 23.2 seconds on day 1), the animals treated with diethyl amino ethanol ribonucleate showed greater improvement (faster jump-out response) than the paired control animals on the first trial.

Pooling the pairs of fast and slow learners, in 13 out of 19 pairs the animals treated with diethyl amino ethanol ribonucleate showed greater improvement than control animals on the first trial (P<0.20).

TABLE I.—FRACTION OF SLOW LEARNING OF ANIMALS PAIRS AVOIDING SHOCK ON DAY 2

| Trial | #1 | #2 |
|---|---|---|
| Treated with diethyl amino ethanol ribonucleate | 10/12 | 7/12 |
| Control | 5/12 | 5/12 |

On day 3, animals received another injection of diethyl amino ethanol ribonucleate or saline, as per day 2, and were tested for retention of jump-out response using a test sequence of 40 seconds of silence with no buzzer or shock.

TABLE II.—FRACTION OF SLOW-LEARNING PAIRS SHOWING JUMP-OUT RESPONSE ON DAY 3

| Trial | #1 | #2 | #3 | #4 |
|---|---|---|---|---|
| Treated with diethyl amino ethanol ribonucleate | 10/12 | 8/12 | 7/12 | 5/12 |
| Control | 7/12 | 4/12 | 4/12 | 4/12 |

EXAMPLE II

Biochemical effects of diethyl amino ethanol ribonucleate

A nuclear aggregate possessing RNA polymerase activity was prepared and assayed according to the method of Glasky and Simon (Science 151: 702, 1966). The incorporation of AMP-$P^{32}$ from ATP-$\alpha$-$P^{32}$ in the presence of required co-factors was measured in the presence and absence of 50 micrograms of diethyl amino ethanol ribonucleate per milligram.

TABLE III.—EFFECT OF DIETHYL AMINO ETHANOL RIBOUNCLEATE ON INCORPORATION OF AMP-P $^{32}$ INTO RNA

[μmoles/mg. protein]

| | Control (no drug) | Experimental diethyl amino ethanol ribonucleate, 50 μg./ml. | Percent increase |
|---|---|---|---|
| 4 NT reaction | 5.7 | 21.4 | 270 |
| 1 NT | 20.0 | 27.4 | 37 |

I claim:
1. A process of improving the mental performance of mammals which comprises administering to the mammal an effective amount of an active ingredient comprising 2-diethylammonium ethanol ribonucleate.
2. A process of improving the mental performance of mammals which comprises administering to the mammal an effective amount of an active ingredient comprising 2-dimethylammonium ethanol ribonucleate.
3. A process of improving the mental performance of mammals which comprises administering to the mammal an effective amount of an active ingredient comprising the salt of disodium aspartic acid and ribonucleic acid.

References Cited

UNITED STATES PATENTS 3,068,222  12/1962  Graig.
3,070,606  12/1962  Anderson.
3,178,342  4/1965  Buzas _____ 167—65

OTHER REFERENCES

Amer. J. of Psychiatry, April 1958, p. 943, Chem. Abstract 58:8172b (1958).

ALBERT T. MEYERS, Primary Examiner